United States Patent
Pieda et al.

(10) Patent No.: US 10,178,237 B2
(45) Date of Patent: *Jan. 8, 2019

(54) METHOD AND SYSTEM FOR TRANSITION OF APPLICATIONS TO A SECOND CELLULAR DATA NETWORKING INTERFACE FOR A VIRTUAL SIM SERVICE

(71) Applicants: BlackBerry Limited, Waterloo (CA); 2236008 Ontario Inc., Waterloo (CA)

(72) Inventors: Peter Steven Pieda, Ottawa (CA); Kerry Gordon Peter Williams, Ottawa (CA); Kevin Dennis Goodman, Nepean (CA); Pierre Pierre Blais, Kanata (CA)

(73) Assignees: BlackBerry Limited, Waterloo (CA); 2236008 Ontario Inc., Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/704,705

(22) Filed: Sep. 14, 2017

(65) Prior Publication Data

US 2018/0007211 A1     Jan. 4, 2018

Related U.S. Application Data

(63) Continuation of application No. 14/725,560, filed on May 29, 2015, now Pat. No. 9,794,419.

(51) Int. Cl.
  *H04M 15/00* (2006.01)
  *H04L 12/14* (2006.01)
  *H04W 4/24* (2018.01)

(52) U.S. Cl.
  CPC ........ *H04M 15/07* (2013.01); *H04L 12/1457* (2013.01); *H04L 12/1471* (2013.01);
  (Continued)

(58) Field of Classification Search
  CPC ............... H04L 9/0625; H04L 12/1471; H04L 12/1475
  (Continued)

(56) References Cited

U.S. PATENT DOCUMENTS 9,014,174 B2    4/2015 Williams et al.
2005/0070278 A1    3/2005 Jiang et al.
(Continued)

FOREIGN PATENT DOCUMENTS

EP    2680663 A1    1/2012
EP    2969553 A1    2/2014

OTHER PUBLICATIONS

European Patent Office, Office Action (Communication pursuant to Article 94(3)) for Application No. 16 168 291.9-1213, dated Mar. 8, 2018.

(Continued)

*Primary Examiner* — Kiet M Doan
(74) *Attorney, Agent, or Firm* — Moffat & Co

(57) ABSTRACT

A method at a user equipment to facilitate splitting of data billing between at least two parties, the method assigning a first subset of application to a first forwarding information base ("FIB") on the user equipment; associating the first FIB with a first cellular data interface; activating the splitting of data billing on the user equipment; and replacing the association in the first FIB to the first cellular interface with an association between a second cellular data interface and the first FIB.

20 Claims, 12 Drawing Sheets

(52) U.S. Cl.
CPC ........... *H04M 15/41* (2013.01); *H04M 15/44* (2013.01); *H04M 15/60* (2013.01); *H04W 4/24* (2013.01)

(58) Field of Classification Search
USPC ......... 455/432.1; 370/252, 329, 353, 395.52, 370/412
See application file for complete search history.

(56) References Cited

U.S. PATENT DOCUMENTS

| | | |
|---|---|---|
| 2009/0298466 A1 | 12/2009 | Guo et al. |
| 2012/0264400 A1 | 10/2012 | Khan et al. |
| 2013/0023235 A1 | 1/2013 | Fan et al. |
| 2013/0054763 A1 | 2/2013 | Van der Merwe |
| 2013/0102276 A1 | 4/2013 | Raj et al. |
| 2013/0212392 A1 | 8/2013 | Nagarajan et al. |
| 2013/0301522 A1 | 11/2013 | Krishna et al. |
| 2013/0316703 A1* | 11/2013 | Girard ................ G06Q 20/145 455/432.1 |
| 2014/0003359 A1 | 1/2014 | Williams |
| 2014/0011478 A1 | 1/2014 | Collins et al. |
| 2014/0128025 A1 | 5/2014 | Raleigh et al. |
| 2014/0189861 A1 | 7/2014 | Gupta |
| 2014/0204771 A1* | 7/2014 | Gao ..................... H04W 36/28 370/252 |
| 2015/0099562 A1 | 4/2015 | Xiong |
| 2015/0113059 A1 | 4/2015 | Lyons et al. |
| 2015/0201417 A1 | 7/2015 | Raleigh et al. |
| 2015/0271662 A1 | 9/2015 | Lhamon et al. |

OTHER PUBLICATIONS

Movirtu, Building an enterprise mobility management ecosystem for telcos, May 7, 2015.
Movirtu, Movirtu Buzz Apr. 2013, Apr. 2013.
Movirtu, Movirtu Buzz Jun. 2014, Jun. 2014.
Movirtu, Movirtu CloudPhone: First to extend virtual mobile numbers to tablets and laptops for mobile calling, Jun. 2, 2014.
Movirtu, Movirtu CloudPhone Product Sheet v3, May 7, 2015.
Movirtu, Movirtu ManyMe Press Release, Feb. 18, 2013.
Movirtu, Movirtu ManyMe Product Sheet v10, May 7, 2015.
Movirtu, Movirtu Share Product Sheet v9, May 7, 2015.
Movirtu, Movirtu WorkLife Press Release, Feb. 18, 2013.
Movirtu, Movirtu WorkLife Product Sheet v11, May 7, 2015.
European Patent Office, Office Action (Communication pursuant to Article 94(3)) for Application No. 16 168 291.9-1213, dated Aug. 31, 2018.

* cited by examiner

108a

| Internet: 202 | 204 | 206 | 208 | 210 | 212 | 114 |
|---|---|---|---|---|---|---|
| Destination | Gateway | Flags | Refs | Use | Mtu | Interface |
| Default | 25.48.90.206 | UG | 13 | 66 | - | msm0 |
| 25.48.90.204/30 | link#6 | UC | 2 | 0 | - | msm0 |
| 25.48.90.206 | link#6 | UHLC | 1 | 0 | - | msm0 |
| 25.48.90.207 | link#6 | UHLC | 2 | 70 | - | msm0 |
| 127.0.0.1 | 127.0.0.1 | UH | 0 | 161 | 33192 | lo0 |
| 127.0.0.2 | 127.0.0.2 | UH | 0 | 0 | 33192 | lo1 |
| 127.0.0.3 | 127.0.0.3 | UH | 0 | 0 | 33192 | lo2 |
| 169.254.208.100/30 | link#7 | UC | 2 | 0 | - | ecm0 |
| 169.254.208.102 | 72:d4:f2:d1:15:ca | UHLC | 4 | 42 | - | ecm0 |
| 169.254.408.103 | link#7 | UHLC | 2 | 21 | - | ecm0 |

FIG. 2

METHOD AND SYSTEM FOR TRANSITION OF APPLICATIONS TO A SECOND CELLULAR DATA NETWORKING INTERFACE FOR A VIRTUAL SIM SERVICE

FIELD OF THE DISCLOSURE

The present disclosure relates to mobile devices and in particular relates to mobile devices having both work and personal applications.

BACKGROUND

The use of user equipment (UE) or mobile devices, including smartphones, cellphones, laptops, digital pagers, among others, is becoming more prevalent. Many of these UEs have at least one cellular connection which may be used for both circuit switch and packet switch calls. Such cellular connections are usually based on a subscription or pre-paid plan with a cellular provider.

In order to access the cellular provider's network, a smart card such as a universal integrated circuit card (UICC) is typically found on such devices, where the UICC has one or more applications used for subscriber identity verification. Such applications may, for example, include a subscriber identity module (SIM) application or a universal subscriber identity module (USIM) application for the global system for mobile communication (GSM) networks, for a universal mobile telecommunications system (UMTS system) or long term evolution (LTE) system, a code division multiple access (CDMA) subscriber identity module application (CSIM application) for a CDMA 2000 network, a remote-user identity module (RUIM) for a CDMA network, international mobile services (IMS) subscriber identity module (SIM) for IMS services, among others. Once authenticated to the network, the user equipment may then exchange voice or data, depending on the subscription with the cellular network.

One trend in the workplace is to bring your own device (BYOD) policy for employers, where employees may bring their own device and be connected to enterprise services on that device. However, allocation of resources and billing for such systems is complex, since it is difficult to distinguish between personal and work phone calls, text messages, and data usage and the associated costs and billing between the two.

BRIEF DESCRIPTION OF THE DRAWINGS

The present disclosure will be better understood with reference to the drawings, in which:

FIG. 2 is an example forwarding information base;

DETAILED DESCRIPTION OF THE DRAWINGS

Figure 1:
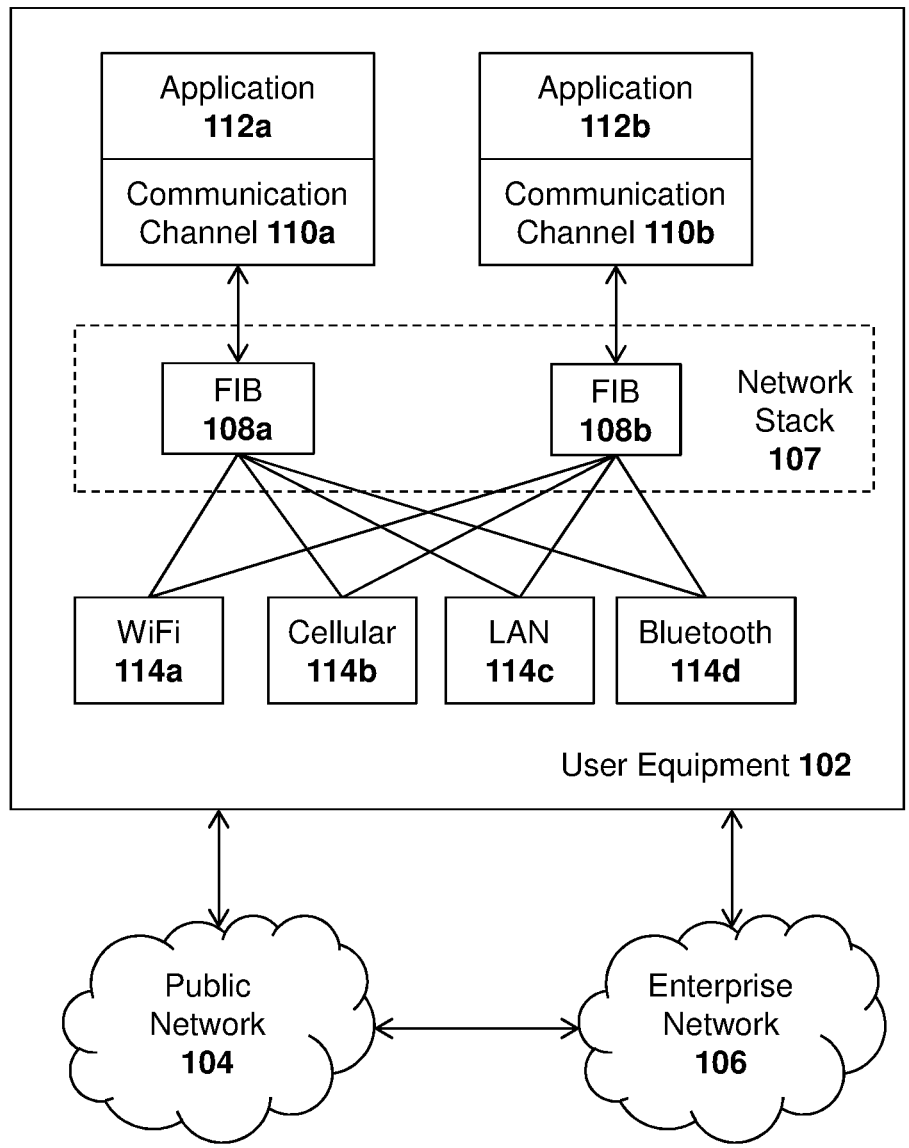
FIG. 1 is an example communication system using each of multiple forwarding information bases (MFIBs) for different applications.

The present disclosure provides a method at a user equipment to facilitate splitting of data billing between at least two parties, the method comprising: assigning a first subset of application to a first forwarding information base ("FIB") on the user equipment; associating the first FIB with a first cellular data interface; activating the splitting of data billing on the user equipment; and replacing the association in the first FIB to the first cellular interface with an association between a second cellular data interface and the first FIB.

The present disclosure further provides a user equipment configured to facilitate splitting of data billing between at least two parties, the user equipment comprising a processor; and a communications subsystem, wherein the user equipment is configured to: assign a first subset of application to a first forwarding information base ("FIB") on the user equipment; associate the first FIB with a first cellular data interface; activate the splitting of data billing on the user equipment; and replace the association in the first FIB to the first cellular interface with an association between a second cellular data interface and the first FIB.

The present disclosure further provides a non-transitory computer readable medium comprising instructions that, when executed by a processor of a user equipment, are configured to facilitate splitting of data billing between at least two parties, the instructions providing: assigning a first subset of application to a first forwarding information base ("FIB") on the user equipment; associating the first FIB with a first cellular data interface; activating the splitting of data billing on the user equipment; and replace the association in the first FIB to the first cellular interface with an association between a second cellular data interface and the first FIB.

Specifically, the present disclosure relates to the addition of one or more identities on a device to allow split billing between such identities. For example, a work and personal plan can be added to a single device, where work phone calls, text messages and data used for work applications may be billed to an employer, whereas personal phone calls, text messages and data usage may be billed to an individual user of the device. However, the present disclosure is not limited to a work and personal split, and the addition of multiple plans to a device is contemplated by the present disclosure. For example, in another embodiment a device may be split between two users and each user may have a separate plan on the device.

In accordance with one embodiment of the present disclosure, multiple billing plans are implemented utilizing a virtual SIM platform (VSP) at a carrier which allows the user to have multiple phone lines in a single SIM in a phone. As used herein, a SIM can be any identity module. Further, two cellular data networks or dual access point names (APNs) may be used, where one APN is for personal cellular traffic and the other APN is for work cellular traffic. Such split allows a user to have voice and data split billing between the work and personal lines.

In accordance with one embodiment of the present disclosure, if a billing split is enabled, data traffic should be sent over the correct interface. Specifically, in a personal/work split, all work traffic should correctly select the work cellular data network or APN. Such traffic could, for example, include data to enterprise networks, as well as personal networking for work purposes when the work APN has performance issues.

Applications on a mobile device typically include a forwarding information base (FIB) that is used for routing data traffic to an interface. Thus, to minimize impact on application code and system changes, networking changes to direct traffic to the correct cellular interface should, in one embodiment, be below the application's knowledge.

Thus, in one embodiment, a new cellular interface is added to the system to represent work traffic sent of a new data APN. The group identifier (GID) of a process will determine which FIB the process is able to access. The sockets of a process typically use the default interface on the FIB. In accordance with the present disclosure, a new FIB is added to a user equipment to house a new work cellular data network interface.

The new FIB will, by default, include all Wi-Fi and cellular interfaces from the personal FIB. On activation of split billing, the personal cellular interface is removed from the new FIB and the work cellular interface is added.

In one embodiment, personal data could be allowed over the work FIB by also copying the work interfaces added to the personal FIB to the new FIB.

Applications that use the new FIB for networking may automatically use the correct cellular interface. Enterprise applications that need to send work traffic via the personal FIB have two options. A first is to start the application in the new FIB. A second it to have the new FIB's GID added to the application GID list based on system authorization. This allows the application to migrate to the new FIB when appropriate.

System services that select a particular interface to use for creating connections into the enterprise are updated to select the work cellular interface for those cases where cellular connection is only available from the device and the split billing is enabled.

Reference is now made to FIG. 1, which shows an exemplary simplified diagram of a communications system. The communications system includes user equipment 102 communicably coupled to a public network 104 and an enterprise network 106. The UE 102 comprises a network stack 107 including multiple forwarding information bases (FIBs).

In some implementations, a forwarding information base is a data structure that associates destination with communication interface information. Such communication interface information may for example include a physical interface.

A UE may have multiple FIBs (MFIBs). In this case, the UE may route communication based on various criteria. For example, different FIBs may be assigned to different applications. In other cases, different FIBs may be used for different prioritization of shared network resources. For example, one FIB may be associated with a trust domain or perimeter for work applications and may give higher priority to certain interfaces within the FIB. In other cases, different FIBs may prioritize networks by type based on a policy decision made external to the UE, such as by a user, corporation, among others.

In the example of FIG. 1, a UE 102 includes two FIBs, namely FIB 108a and FIB 108b. However, this is merely an example and in other cases more FIBs could be included on the device. For example, a device may have a FIB for personal applications, a FIB for work and secure applications, a FIB for tethering, and a FIB for enterprise administration.

Each FIB is associated with a communication channel (110a and 110b) from applications (112a and 112b).

Various interfaces, including Wi-Fi 114a, cellular 114b, local area network (LAN) 114c and Bluetooth™ 114d are shown in UE 102.

The Network Stack 107 may receive requests to access the FIB 108a, 108b. If access to the requested FIB 108a, 108b is granted, the FIB 108a, 108b may provide routing information to the Application 112a, 112b from which the request originated. In some cases, the Network Stack 107 may merely receive a communication and determine which FIB 108a, 108b is mapped to the Communication Channel 110a, 110b.

In FIG. 1, communication channel 110a routes communication for application 112a based on the routing information provided by FIB 108a, and the communication channel 110b routes communication for application 112b based on the routing information provided by FIB 108b. Applications 112a and 112b may be configured to provide services to one or more users, and each of the physical interfaces 114a-d may communicate with at least one of the public network 104 or the enterprise network 106.

UE 102 may comprise a tablet, mobile device, personal computer, laptop computer, among others. The embodiment of FIG. 1 is however not meant to be limiting and other devices could be used.

UE 102 generally includes a processor which controls the overall operation of the device. Processor interacts with device subsystems such as for example a display, memory, auxiliary input/output (I/O) subsystems, serial port, one or more keyboards or keypads, where keyboard or keypad may comprise a physical keyboard or a virtual keyboard or both, one or more speakers, microphone, other communication subsystem such as a short-range communications subsystem, including Bluetooth and near field communications, and any other device subsystems. Serial port could include a USB port or other port.

Memory of UE 102 may be segregated into various modes of operation, sometimes referred to as perimeters, as described below. Such segregation may be physical or logical. Operating system software used by the processor may be stored in such memory. The operating system, specific device applications, or parts thereof, may be temporarily loaded into a volatile memory such as random access memory (RAM).

Applications may be loaded onto the device and associated with a mode of operation (also called a 'perimeter') in some cases. In some embodiments, such applications and data for the application may be stored in memory and associated with the perimeter. For example, separate areas of memory may be used to store the applications or data for each perimeter in some embodiments. In other embodiments, applications or data may be encrypted with a key associated with a perimeter and applications or data for a plurality of perimeters may be stored together. Other options are possible.

In the example of FIG. 1, network stack 107 may include any software, hardware, firmware or combination thereof configured to coordinate communication with applications 112a and 112b using the FIBs 108a and 108b and the physical interfaces 114a-d. For example, the network stack 107 may verify whether a requesting application 112a has been granted permissions for access to FIB 108a and, if so, provide the application 112a access to the FIB 108a. In some cases, the network stack 107 may manage FIBs 108a and 108b and manage connection of communication channels 110a and 110b with FIBs 108a and 108b.

FIBs 108a and 108b may include any parameters, variables, policies, algorithms, instructions, settings or rules for routing communication to at least one of the Public Network 104 or the Enterprise Network 106. For example, the FIB 108a, 108b may map a destination address to a Physical Interface 114a-d, another FIB, another communication channel or others. In general, the FIB 108a, 108b may be any data structure configured to map or otherwise associate a destination address to a Physical Interface 114a-d. However, FIBs 108a, 108b may equally be comprised of any other data structure and still be within the scope of the present disclosure.

In some cases, FIBs 108a, 108b may include or otherwise identify one or more of the following: destination network address (destination; address of the outgoing interface (gateway); state of the route (flag); current number of active uses for the route (refs); count of the number of packets sent using that rough (use); maximum transmission unit (Mtu); physical interface (interface); or others.

The communication channel 110a, 110b can include any software, hardware, firmware or combination thereof configured to route communication from application 112a, 112b to at least one of the public network 104 or the enterprise network 106. For example, the communication channel 110a, 110b may be an inter-process communication (IPC) channel between the application and the network stack configured to determine a physical interface 114a-d to route communication based on the FIB 108a, 108b.

In some implementations, the communication channel 110a, 110b may be one endpoint of a two-way communication link between an application 112a, 112b and an application running in the public network 104 or the enterprise network 106. For example, the communication channel 110a, 110b may be bound to a port number for a physical interface 114a-d so that the transmission control protocol (TCP) layer can identify the application 112a, 112b to which data is destined to be sent. In some cases, an application 112a, 112b may access the same communication channel 110a, 110b for all communications and the communication channel 110a, 110b may switch between accessing the different FIBs 108a, 108b.

The applications 112a, 112b may be any application, program, module, process or software that may execute, change, delete, generate or otherwise manage information, such as business information, according to the present disclosure. For example, the application 112a, 112b may include a notification application, a contacts application, a calendar application, a messaging application or others. Further, while illustrated as internal to UE 102, one or more processes associated with the application 112a, 112b may be stored, references or executed remotely.

In some cases, applications 112a, 112b may be configured to access different perimeters, such as a personal perimeter or an enterprise perimeter.

In connection with determining an interface 114a-d, the application 112a, 112b may execute one or more of the following: determine a FIB 108a, 108b based on MFIBs assigned to the application 112a, 112b; transmit a request for access to a FIB 108a, 108b to the network stack 107; determine a physical interface 114a-d for the destination based on an assigned FIB 108a, 108b; determine whether an assigned FIB 108a, 108b identifies a further FIB 108a, 108b to use to identify the physical interface 114; determine the physical interface 114 to be used based on the destination of a communication and the further FIB 108a, 108b; or others.

UE 102 may include interfaces 114a-d for communication with other computer systems over at least one of the public network 104 or the enterprise network 106 in a client-server or other distributed environment. In certain implementations, the UE 102 receives data form internal or external senders through interfaces 114a-d for local storage, processing or both.

Generally, interfaces 114a-d comprise logic encoded in software, hardware, firmware or a combination thereof operable to communication with at least one of the public network 104 or the enterprise network 106. More specifically, the interfaces 114a-d may comprise software supporting one or more communication protocols associated with the public network 104 or the private or enterprise network 106, or comprise hardware operable to communicate physical signals.

The examples of interfaces 114a-d in FIG. 1 are merely illustrative, and other interfaces are possible. The present disclosure is not limited to the particular interfaces shown in the figure.

Reference is now made to FIG. 2, which illustrates an example FIB 108a. In particular, FIB 108a comprises a routing table which may include a destination column 202, a gateway column 204, flags column 206, refs column 208, use column 210, Mtu column 212 and interface 114. The destination column 202 may identify a destination network address. The gateway 204 may identify an address of the outgoing interface. The flags column 206 may identify a state of the route. The use column 210 may identify a count of the number of packets sent using that route. The Mtu column 212 may identify a maximum transmission unit. The interface 114 may identify a physical interface.

Thus, for example, FIB 108a may map or otherwise associate a destination network address to a physical interface 114. As illustrated in the example of FIG. 2, the address "25.48.90.204/30" maps to the "msm0" at the physical interface. In addition to interfaces 114, the FIB 108a may map or associate a destination network address to a different FIB, another communication channel 110, or other elements.

Figure 3:
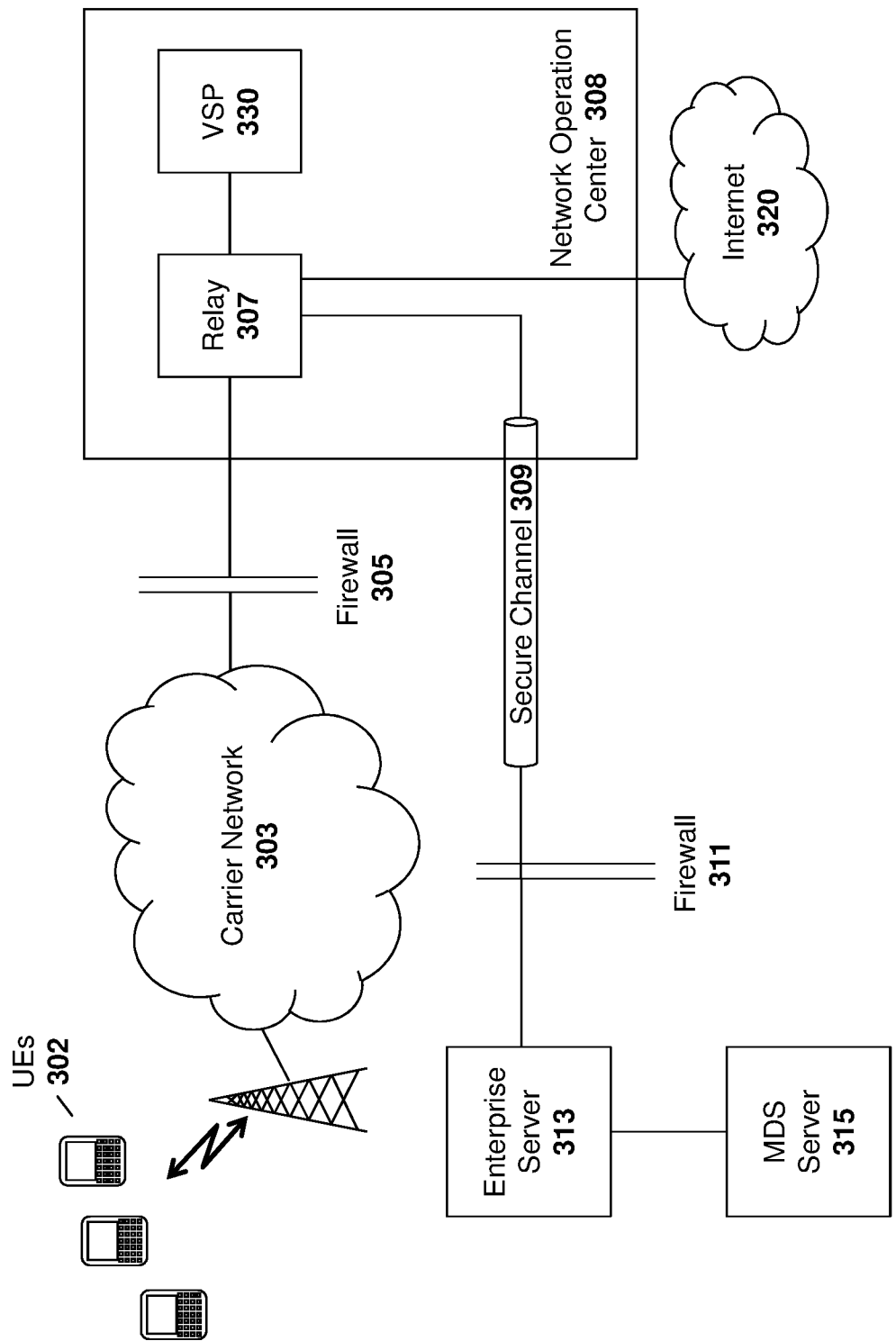
FIG. 3 is a block diagram showing a user equipment communicating through a carrier network with either public or enterprise servers.

The above device may be used with various networks. Reference is now made to FIG. 3, which shows a block diagram of an example wireless data network in accordance with the present disclosure and with which the various embodiments of the methods of the instant disclosure may cooperate.

In the example of FIG. 3, UEs 302 are connected over a mobile carrier network 303 for communication through a firewall 305 to a relay 307 within a network operation center 308. A device that receives policies through an enterprise mobility management server, such as a BlackBerry Enterprise Service, may use such infrastructure. As seen in FIG. 3, communication from one of UEs 302 is received at relay 307 and passed via a secure channel 309 through firewall 311 to a corporate enterprise server 313 and corporate mobile data system (MDS) server 315.

Similarly, policies and data may be pushed from enterprise server 313 to a UE 302 through firewall 311, over secure channel 309 to relay 307, where the policies and data are pushed through firewall 305, over carrier network 303 to a UE 302.

A device that includes both personal and work spaces or applications may interact both with the enterprise servers, such as server 313 and MDS server 315, as well as over carrier network 303 to the internet 320, for example for personal applications.

A module within a network operation center that is carrier controlled is shown in FIG. 3 as virtual SIM platform (VSP) 330, which may provide a virtual SIM for a UE 302. In particular, VSP 330 may allow a UE 302 to have a real SIM from the carrier, as well as a virtual SIM. The combination of the real SIM and virtual SIM allow a device 302 to have a plurality of voice and data connections to a cellular network as described below.

Utilizing the above architecture, data billings split can be provided in two ways. A first method is to use a dual access point name (APN) in which there are two APNs provided by a carrier. A carrier may then track how much data is utilized on each APN.

In a second embodiment, counters may be used. In this case, the carrier only has one APN but needs to count on the device how much data is sent via the work or personal spaces. While the counter may be used in certain circumstances, the description below will utilize the dual APN process.

In order to support split billing on a device in accordance with the embodiments described below, the device will need to support a VSP service. Once the VSP service is configured for both voice and data, interactions with the network through the carrier may be routed on different interfaces, allowing the carrier to bill the circuit switched or packet switched calls correctly. Specifically, on a VSP device activation, a second data APN can be added along with a work cellular logical interface. Data over the second APN may then be considered work data and billed appropriately.

Figure 4:
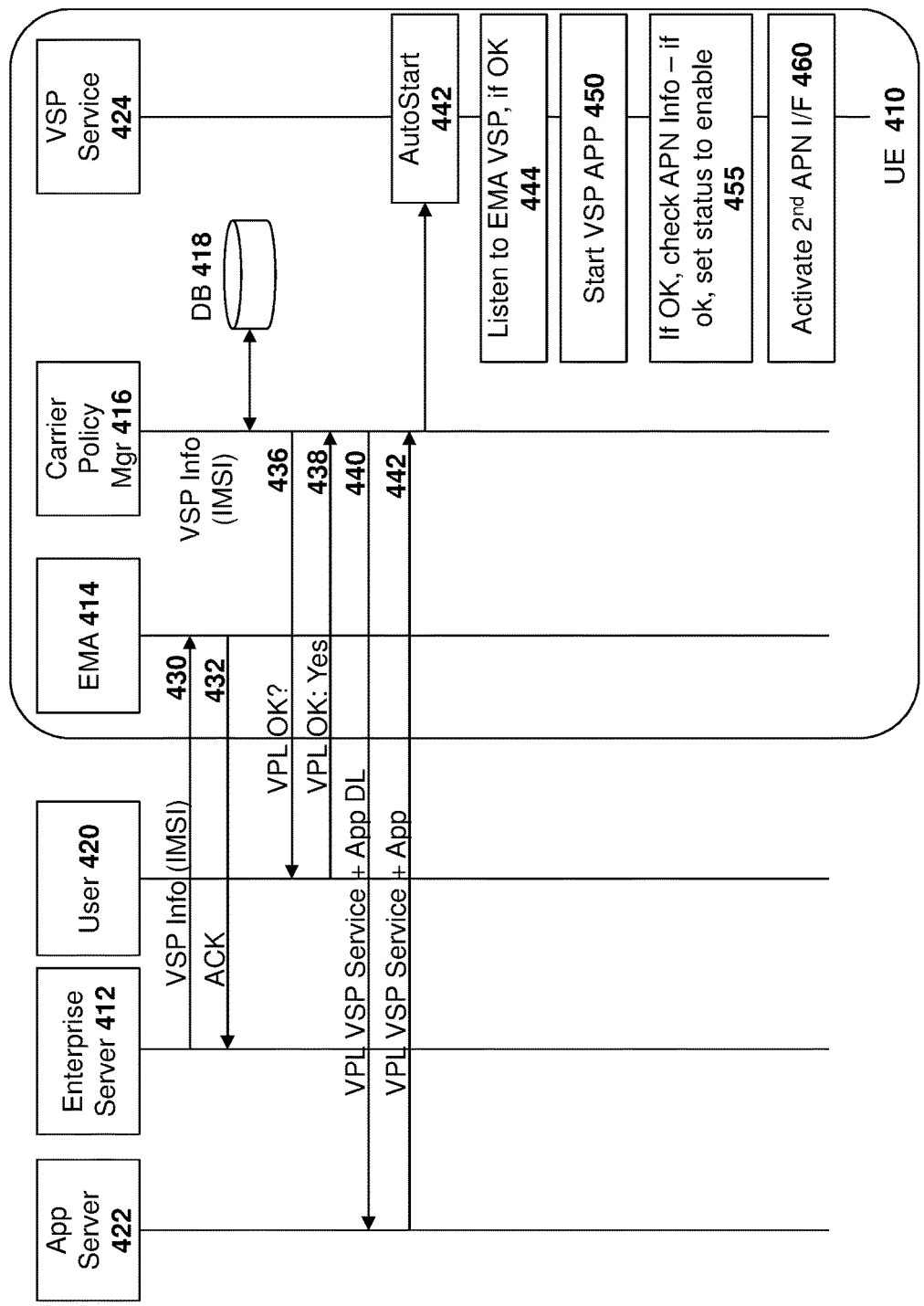
FIG. 4 is a data flow diagram showing initialization of a VSP service on a user equipment.

Reference is now made to FIG. 4. In FIG. 4, a data flow is shown for enabling the virtual number and data connection for a UE 410. In particular, an enterprise may wish to have both a work and a personal billing enabled on a UE 410. In this case, an enterprise server 412 obtains, from a VSP server 330, a virtual phone number from the VSP. The enterprise server 412 may then send VSP information for a UE 410, including the virtual phone number, as well as other information. Such information may include, for example, an identifier, such as an international mobile subscriber identity (IMSI), that was obtained from UE 410 when a SIM card was inserted.

The enterprise server 412 communicates with an enterprise management agent (EMA) 414 on UE 410. Enterprise server 412 may push the previously obtained VSP information to the enterprise management agent 414, as shown by message 430. In one embodiment, an identifier is also pushed to the UE 410. For example, such identifier may be an international mobile subscriber identity (IMSI) created for the virtual SIM.

The enterprise management agent 414 may receive the message 430 from enterprise server 412 and consider this to be a policy of the enterprise and cause actions to be taken on UE 410. Further, enterprise management agent 414 sends acknowledgement message 432 back to the enterprise server 412.

Enterprise management agent 414 may store the persistent objects found within message 430 on the device for future use. For example, enterprise management agent 414 may store VSP information within its own database or in a persistent object store for the enterprise management agent 414.

The carrier policy manager 416 communicates with a database that may be located on an actual SIM within device 410. Such database is shown with reference 418 in the embodiment of FIG. 4. In other embodiments, the database 418 may be located on the device but may be populated when a SIM is inserted into device 410. As part of the carrier's configuration of UE 410, the carrier policy manager 416 may receive the second APN cellular configuration.

A virtual preload (VPL) of a VSP application may then occur. The virtual preload (VPL) may, in some embodiments, be provided to a user for the user's approval. In particular, as shown in FIG. 4, user 420 will receive message 436 asking whether or not the virtual preload for the VSP service is okay and if the user approves, as shown by message 438, then the procedure for installing the VSP service may continue.

The carrier information manager 416 may then request, from an application server 422, the VSP service application. Such request is shown by message 440. Application server 422 may be any remote server providing application data to a mobile device (i.e UE 410).

The application server 422 returns the VSP service application, as shown by message 442. Message 442 causes the application to be launched and installed on the device.

The launching may involve several processes. For example, VSP service 424 may, once launched, listen to the enterprise management agent 414 to determine whether the VSP information provided by the enterprise server 412 is okay, as shown by block 444. If yes, then the process may proceed to block 450 in which the VSP application is started.

As used herein, a VSP application is the entity that communicates with the VSP network component for virtual SIM information, including the virtual phone number. The VSP service interfaces with the system to give deep integration into the device. Such VSP service includes the user interface components, SMS, the second APN being brought up, among other functionality.

Referring again to FIG. 4, if the application is started successfully, as shown by block 452, then the VSP service 424 will activate a second APN interface, as shown by message 460. From FIG. 4, the virtual lines and bill split are now set up and ready to use.

The second data APN that is added to the enterprise_unsecure FIB may be represented as a logical interface in the system. The new work cellular interface is not secure since it is not pushed from an enterprise server and is over an unsecured carrier network.

The new interface may be assigned a type or label such as "cellular_work". This type allows the system services that deal directly with interfaces to be able to differentiate personal cellular and work cellular interfaces. In order to support such new interface, a new routing domain or FIB may be added in a multi-FIB device. For example, such new FIB may be considered a "enterprise_unsecure" FIB since it is was pushed by a carrier and is therefore considered by the enterprise to be an unsecure connection.

In this case, secure data may be sent over a separate interface, labelled as "enterprise_secure". Previously all unsecured communication would go over a personal connection. However, for billing purposes, now an enterprise_unsecure routing domain is provided to allow for certain data communications to be processed over such unsecured communication. The work cellular interface is then added to this FIB and other interfaces such as Wi-Fi or VPN interfaces from the Personal FIB may also be added to the new FIB.

Applications may then be assigned to the new FIB based on a group identifier associated with the application. Specifically, applications are assigned a group ID associated with a FIB. In many cases, an application will have a single group ID associated with a single FIB. However, in some cases hybrid applications or services may access multiple FIBs by having multiple group IDs associated with such application. Further, applications may be hybrid in which case they would permit communications over the enterprise_unsecure FIB or personal FIB.

In some situations, preference may be given to a particular FIB for hybrid applications. Such preference may be utilized, for example, to select a Enterprise FIB first. However, if the Enterprise FIB is overly busy or causes significant delay then a personal FIB may be utilized instead.

After such enterprise_unsecured FIB has been put on to the device, all data traffic that is routed over this FIB may then be accurately captured by the carrier and billed to the enterprise rather than to the personal account of the mobile device holder.

By using multiple routing domains or forward information bases, each perimeter or personality on the device may have its own routing table or domain, its own interface and its own interface priorities. In this case, traffic that proceeds over a personal FIB has different routing in place than traffic over other FIBs. Separate interface priorities allow a default route interface to be different for each FIB. This architecture also adds an extra level of security by not exposing interfaces to other FIBs.

Figure 5:
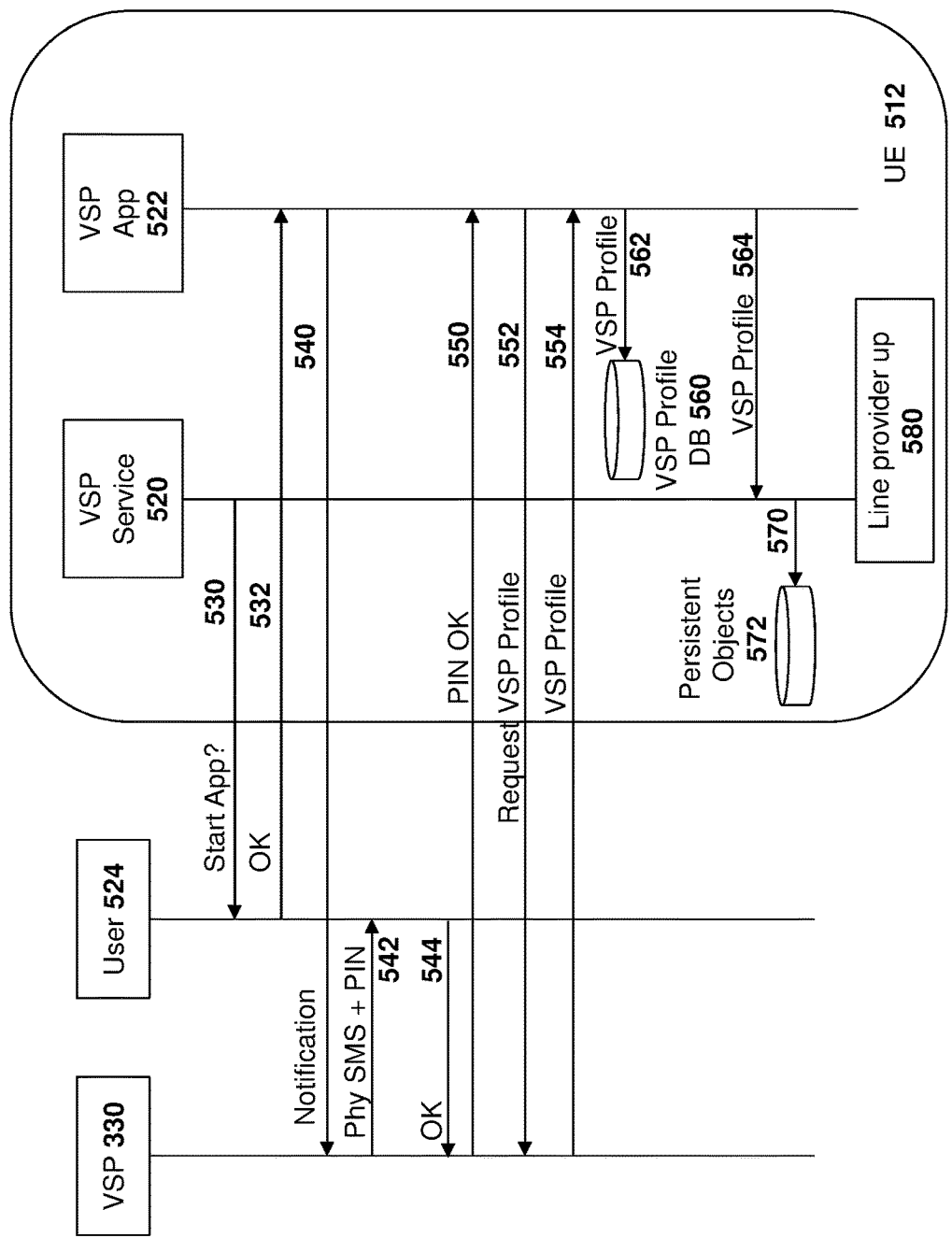
FIG. 5 is a data flow diagram showing activation of a VSP application to create a circuit switched connection.

Reference is now made to FIG. 5, which is a data flow diagram showing the enablement of voice on the VSP service. In particular, as seen in FIG. 5, a carrier includes a VSP server 330 which may communicate with UE 512.

UE 512 includes a VSP service 520 and a VSP application 522. A user 524 may in some cases be required to approve the services or activation of the services on the UE 512.

In particular, as seen in FIG. 5, a VSP service 520, when starting, may provide a notification to the user 524 as shown by message 530. Such message may be provided to the user to indicate whether or not it is acceptable to start the service. If the user approves, as shown by message 532, then the VSP application 522 may provide a notification 540 to the VSP server 330.

Once notification 540 is received, VSP server 330 may then, optionally, provide verification messages to user 524. These are shown by message 542 providing a text message to user 524 to confirm a PIN. A user confirmation is shown by message 544.

Messages 542 and 544 are optional. In other embodiments, when notification 540 is received by VSP server 330, VSP server 330 may automatically indicate to the VSP application 522 to continue.

In the embodiment of FIG. 5, if the PIN is okay then a message to continue is sent, as shown by message 550. VSP application 522 receives message 550 and requests a VSP profile for the UE 512, as shown by message 552.

VSP profile may include the secondary (or virtual) phone number and other information for the device and may be pushed to the device in message 554.

VSP application 522 receives message 554 and stores the VSP profile in a VSP profile database 560. Such storing is shown by message 562.

The VSP application 522 may then provide the VSP profile to the VSP service 520, as shown by message 564.

The VSP service 520 may then store the VSP profile as a persistent object in the operating system of the UE 512, shown by message 570. The persistent object store is shown by block 572 in the embodiment of FIG. 5.

At this point, the line provider is up, as shown by block 580 and the secondary phone number may be utilized.

In some cases, the VSP profile of message 554 may be enabled by the enterprise server. In particular, the enterprise server may request certain phone numbers or reserve certain phone numbers and other information from the VSP server 330 to be pushed to UE 512.

The persistent objects within the operating system at block 572 may control the profile for certain uses. For example, the user interface may be changed on the device to allow for the calling from different numbers. Thus, an option may be given to user to phone from a first number from a second number. Further, text messaging or SMS applications may also be provided with two different numbers, and in some cases two different inboxes or application spaces may be provided for such separate SMS numbers. In some cases the first number may be used for a first bill and the second number may be used for a second bill.

Figure 6:
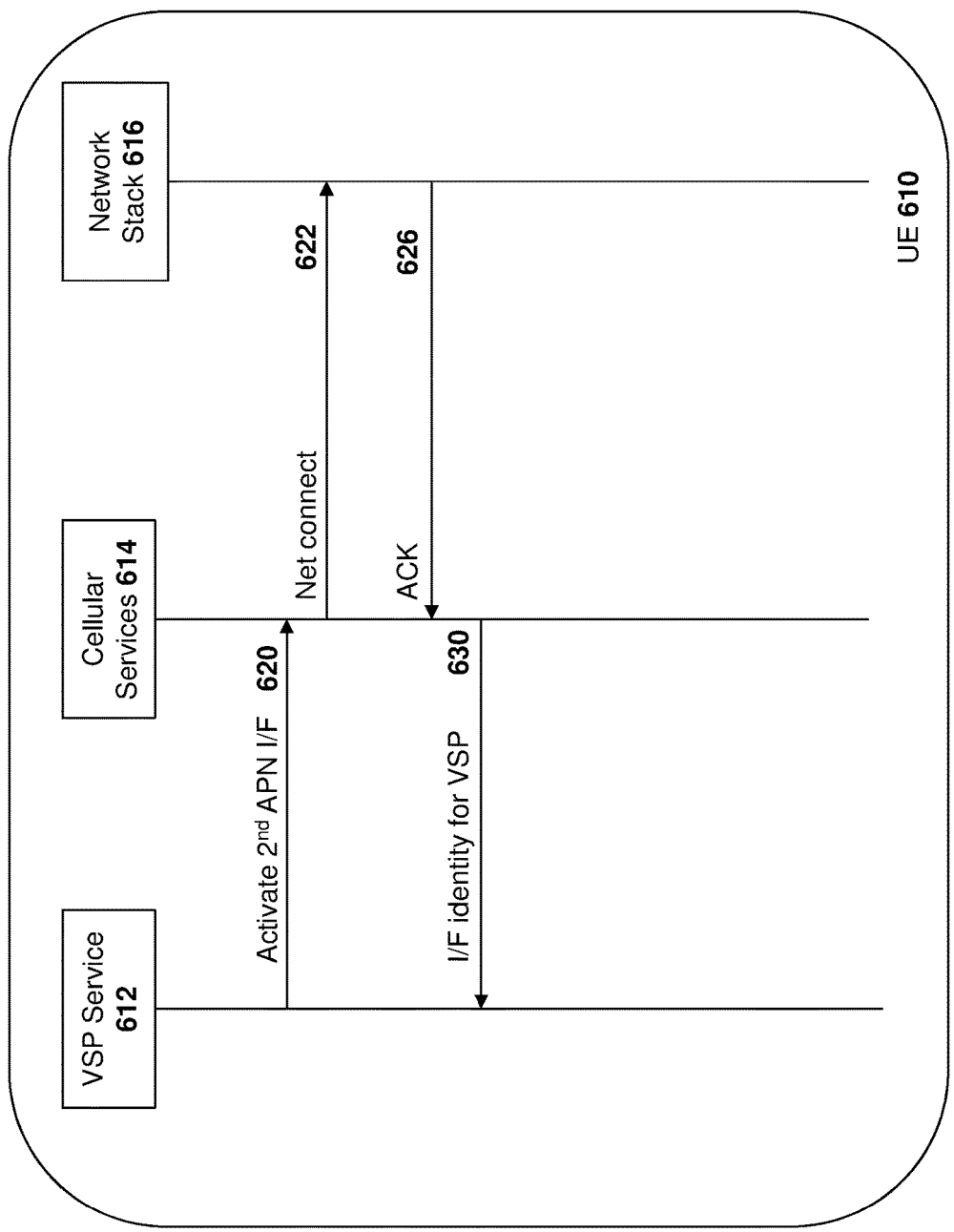
FIG. 6 is a data flow diagram showing configuration of an APN in a persistent object store.

Reference is now made to FIG. 6 which shows data enablement for the second APN. In particular, work data may flow over the second APN, as described above.

As seen in FIG. 6, a UE 610 includes the VSP service 612 that was installed, for example, as described in regards to FIG. 4. The device further includes a cellular services module 614, as well as a network stack 616.

In the embodiment of FIG. 6, once the second phone line is activated, the VSP service 612 may request the activation of the second APN interface from the cellular services module 614, as shown by message 620.

Cellular services module 614 receives message 620 and initiates the creation of the interface for the FIB as described above with the network stack 616, as shown by message 622. Message 622 may include information such as the interface, the FIB, and the type label, for example.

Once the persistent object has been stored, an acknowledgement 626 may be provided. The interface is then provided from the cellular service 614 to the VSP service 612, as shown by message 630.

The creation of the interface and the FIB may result in several factors. For data, once the data is enabled over the second APN, certain applications may select connections with the cellular work FIB as needed. For example, a VPN manager may be set to prefer the cellular work interface.

Further, certain device specific connections may also be set to select work cell connections as needed.

Further, as described in more detail below, enterprise_unsecured FIBs may have the personal cellular interface removed and the work cellular interface added, thereby ensuring that enterprise_unsecured messages are billed to the cellular work bill. Until the service is activated, exiting applications that normally would send enterprise_unsecure traffic would use a personal cellular interface in the enterprise_unsecure FIB to ensure they still have connectivity. In this way, when the VSP service is enabled, the application does not need to change.

While the above describes the creation and setting up of the second phone line and data APN, the device also may have procedures for power up and deletion of the services.

Figure 7:
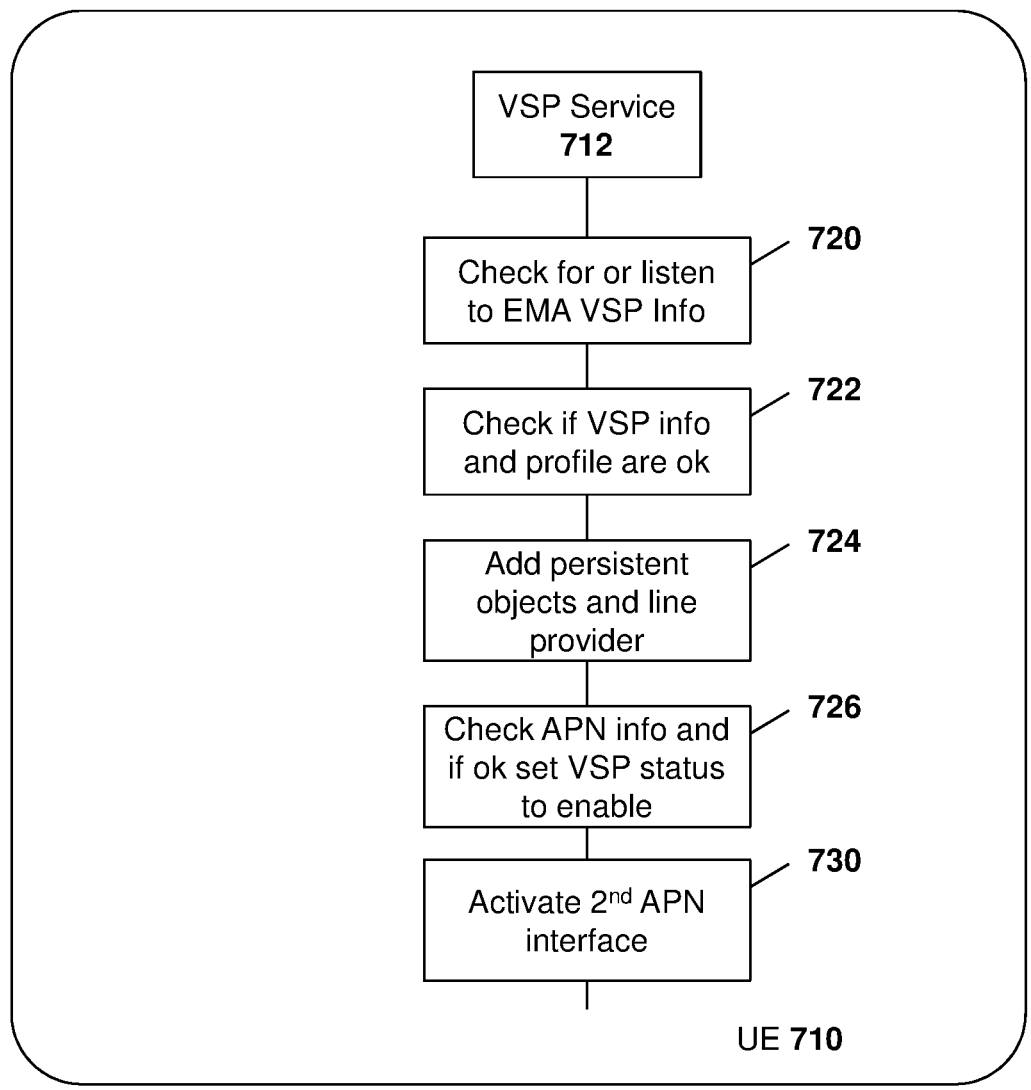
FIG. 7 is a data flow diagram showing the activation of a second data access point name (APN)

In particular, reference is now made to FIG. 7, which shows a process on a device for power up. As seen in FIG. 7, UE 710 includes VSP service 712. On power up, the device first checks and listens to the enterprise management agent, for example enterprise management agent 412 from FIG. 4 above, to determine whether or not the VSP information is okay, as shown by block 720.

If yes, the process of FIG. 7 proceeds to block 722 in which a check is made to determine whether the VSP information and the VSP profile are okay against the particular SIM that is inserted in the device. If yes, the process proceeds to block 724 in which the persistent objects are added and the line provider is brought up.

Once the line is active, the APN information is then checked as shown by block 626 in FIG. 6. If the second APN is okay then VSP status is set to enabled.

The process then proceeds to block 730 in which and the second APN interface is activated.

If any of the steps fail, then the VSP service is disabled and the device may consider that it is waiting for new VSP information from the enterprise server.

If, for example, a new SIM is inserted into the device, the new SIM may also be enabled for VSP. In this case, the enterprise server may also provide any new identifier such as the IMSI and the process as outlined in FIG. 4 may proceed to initialize the VSP service.

Figure 8:
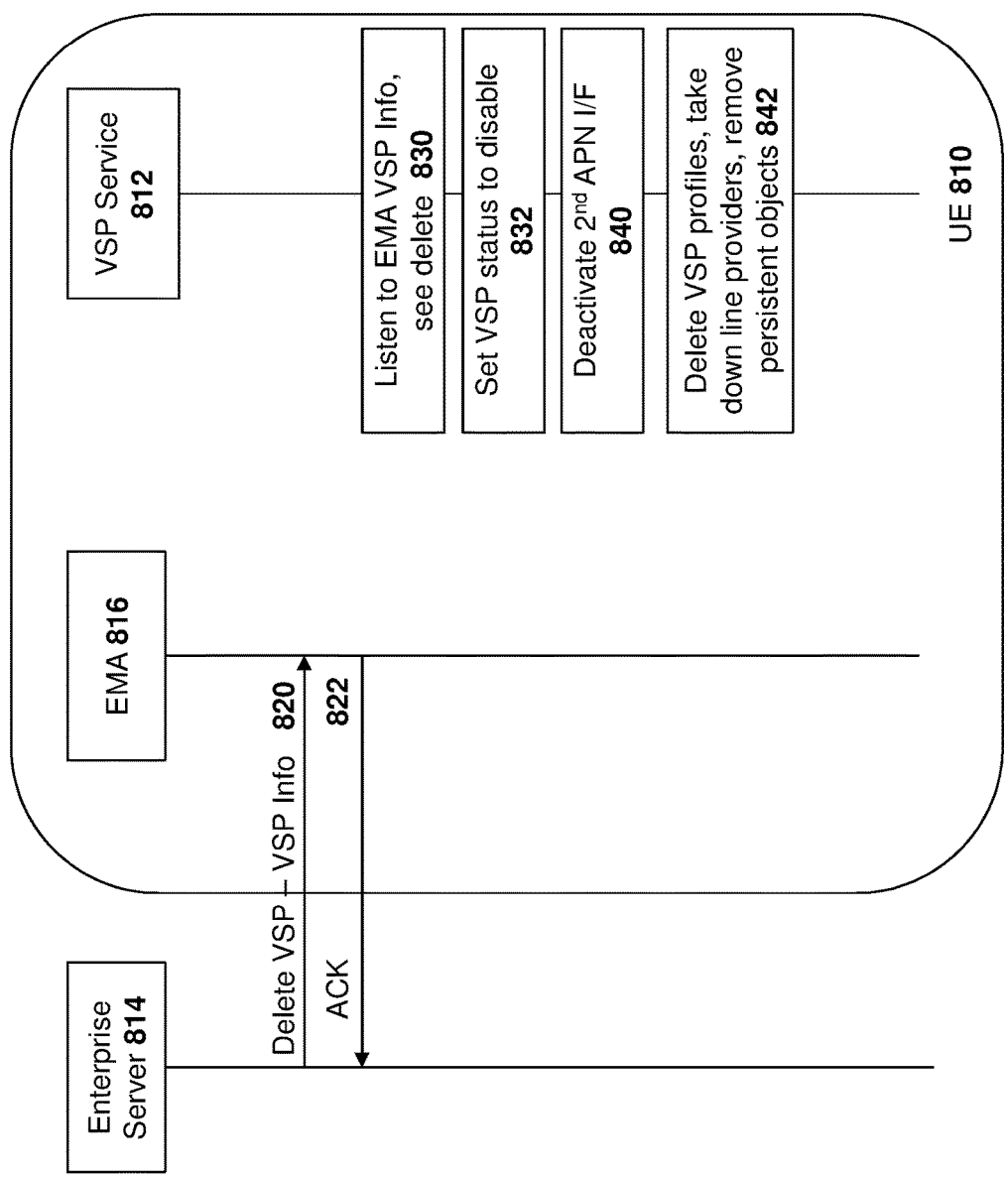
FIG. 8 is a data flow diagram showing the deletion of a VSP service from a device.

In a further embodiment, a VSP service may need to be deleted from a device. Reference is now made to FIG. 8. In particular, UE 810 may no longer be needed to be used by an enterprise. For example, the employee may leave the workplace and the employer may wish to remove the VSP service from the device.

In this regard, UE 810 communicates with enterprise server 814 using EMA 816 on the UE.

UE 810 further includes VSP service 812.

Enterprise server 814 may send a delete VSP command with information regarding the VSP service to the enterprise management agent 816, as shown by message 820. Enterprise management agent 816 may acknowledge message 820, as shown by message 822.

Enterprise management agent 816 then triggers the VSP service 812 to perform the deletion of the VSP application and settings. In particular, as shown by FIG. 8, the VSP service 812 listens to the enterprise management agent for VSP information and sees a deletion request, as shown by block 830. The VSP service 812 then sets the enablement of the VSP service to false as shown by block 832.

The VSP service 812 may then de-activate the second APN interface as shown by arrow 840 and may then delete the VSP profiles, take down line providers, remove the persistent objects in the operating system (including received SMS texts), among other tasks, as shown by block 842.

In one embodiment, the app may not be deleted. In other embodiments, the app may be deleted and may need to be retrieved again upon the device being connected to an enterprise server requiring the VSP services.

Figure 9:
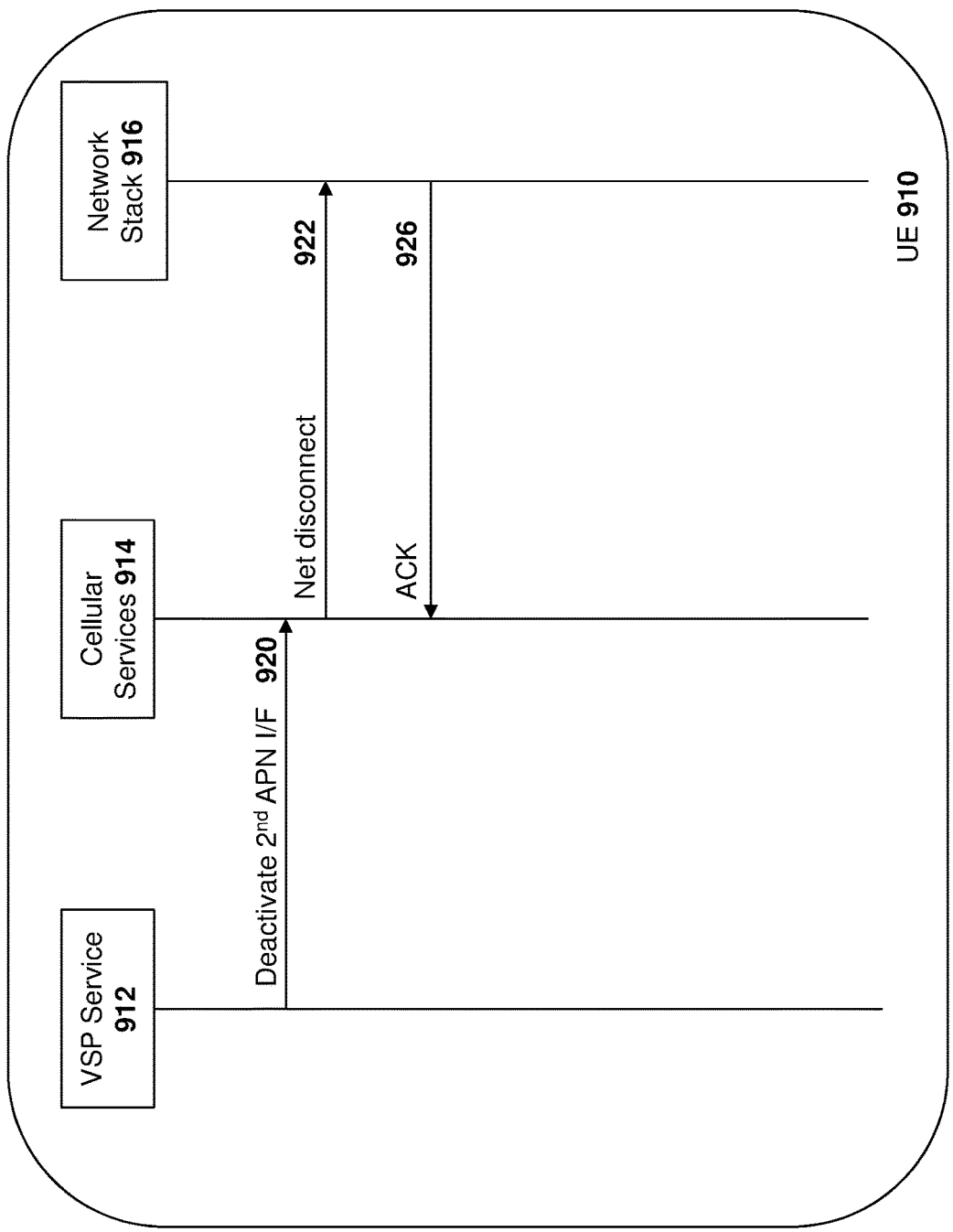
FIG. 9 is a data flow diagram showing deactivation of a second APN.

From FIG. 8 above, the deactivating of the second APN may be accomplished in accordance with FIG. 9. As seen in FIG. 9, UE 910 includes VSP service 912, cellular services modules 914 and the network stack 916.

In disabling the dual APN data, the VSP service 912 sends a message 920 to the cellular services module 914 to deactivate the second APN interface.

Cellular services module 914 then sends the network stack 916 a message to disconnect the interface FIB and parameters as shown by message 930.

The persistence manager may then acknowledge the message, as shown by message 926.

As will be appreciated, FIG. 9 shows the device side functionality. The carrier network (server side) functionality may include cleaning up the connection for the UE 910 once the VSP service is deactivated.

With the above, the insertion or removal of a SIM may cause the VSP to be activated or deactivated. In particular, the VSP service, upon hot SIM insertion, removes the VSP persistent objects in the operating system and disables the VSP service, removing any state with the second APN if the new SIM inserted does not match with the SIM the service was activated on. This way, if a user pulls the SIM and reinserts it, re-registration is not required and information with not be lost.

A hot SIM insertion would include the power on scenario as described above with regard to FIG. 7.

For a single APN, a counter may be introduced on the device. Thus, data travelling over a cellular interface would have a counter to indicate the amount of data that is sent/received for personal versus the amount of data that would be sent/received for work. As will be appreciated by those skilled in the art, for Wi-Fi connection, data counters are not needed since the Wi-Fi connection is not typically billed for data usage.

The data is recorded from device start up and keeps records of all applications that were run until shutdown. These records could then be harvested and reconciled for VSP infrastructure so that carrier billing may be achieved.

In an alternative embodiment to the above, a work device may be adapted to include a personal space. In this case, a bring your own number (BYON) or Corporate Owner Personal Enabled (COPE) scenario may exist in which the physical SIM is related to the work number and the virtual SIM created through the VSP is utilized for the personal services. In this manner, the correct cellular interface may be added to the appropriate FIB for data tracking.

In accordance with the above, one aspect of the present disclosure is the use of a work cellular interface for applications having work data.

As indicated above, knowledge of the interface is below an application layer.

Figure 10:
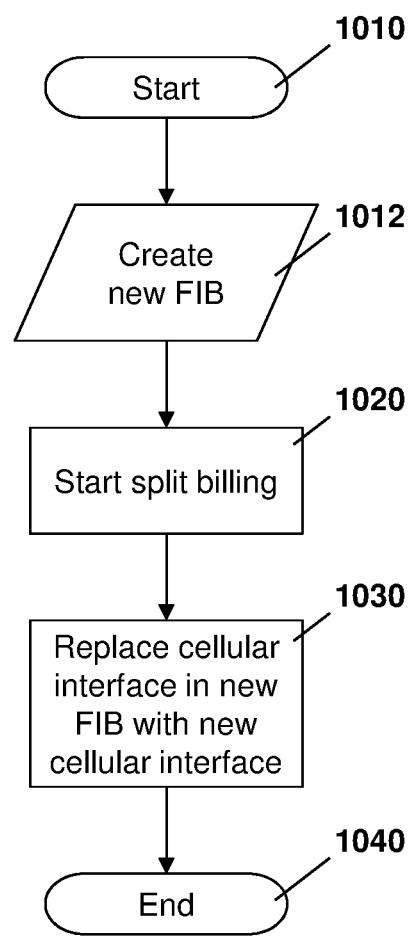
FIG. 10 is a process diagram showing a process for reassigning a data cellular interface in a forwarding information base (FIB) on activation of split billing.

For example, reference is now made to FIG. 10, which shows a process for migrating an enterprise_unsecure FIB from a personal cellular interface to a work cellular interface. The process of FIG. 10 starts at block 1010 and has a precondition that the enterprise_unsecure FIB has been created on the UE, as shown by block 1012. As will be appreciated by those in the art, in embodiments where the split billing is not work/personal then the FIB may have a different name.

The process proceeds to block 1020 in which split billing is started. This may be, for example, the creation of the second APN as described above with reference to FIGS. 6 and 7.

The process then proceeds to block 1030 in which the personal cellular interface in the enterprise_unsecure FIB is replaced with the new work cellular interface for the device. In this way, prior to split billing being initiated, an application that is designated as a work application may utilize the enterprise_unsecure FIB which will use the personal cellular interface. By replacing this interface with the work cellular interface, split billing is achieved without an application having knowledge of the change. Thus, the enterprise_unsecure FIB could reside on the device both before and after split billing is activated.

From block 1030 the process proceeds to block 1040 and ends.

The process of FIG. 10 may further include restoring the association to the personal cellular interface if the split billing is deactivated. Specifically, if the second APN is disabled, the enterprise_unsecure FIB may use the personal cellular interface as the default interface again.

Figure 11:
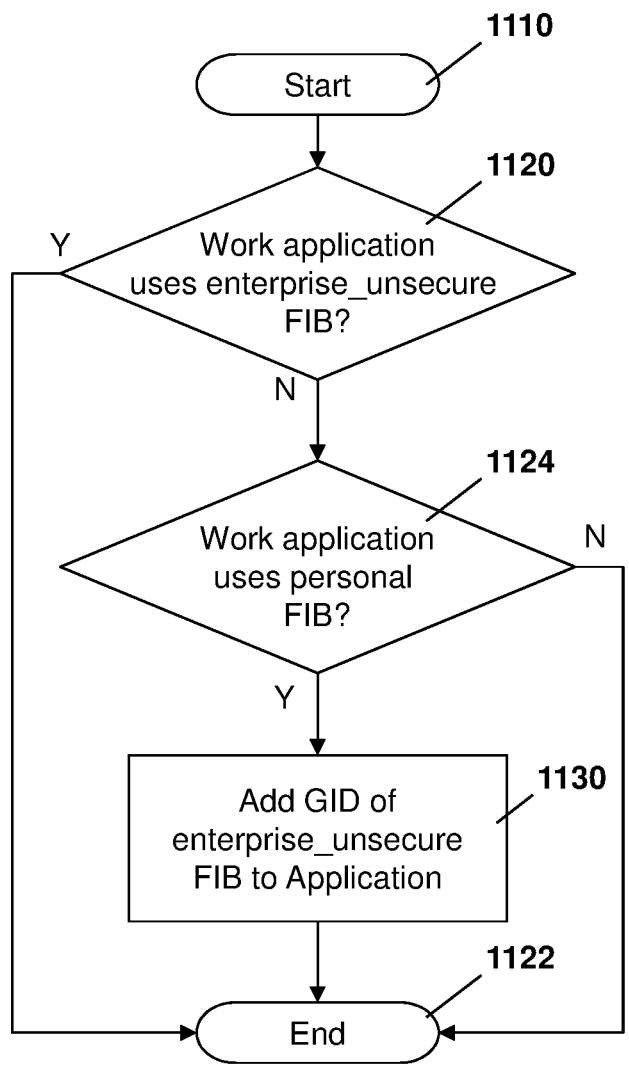
FIG. 11 is a process diagram showing a process for associating an application with a new cellular interface.

Reference is now made to FIG. 11, which shows a process on a UE for utilizing the work cellular interface by an application. In particular, the process starts at block 1110 and proceeds to block 1120 at which a check is made to determine whether the application already uses the enterprise_unsecure FIB. If an application already uses the enterprise_unsecure FIB then no change is needed and the split billing is achieved and is transparent to the application. Thus, from block 1120, if the enterprise_unsecure FIB is used the process proceeds to block 1122 and ends.

Conversely, if the application does not use the enterprise_unsecure FIB then the process proceeds to block 1124 in which a check is made to determine whether the application uses the personal FIB. If yes, the process proceeds to block 1130 at which the GID of the enterprise_unsecure FIB is added to the application, allowing the application to migrate to the enterprise_unsecure FIB when appropriate. From block 1130 the process proceeds to block 1122 and ends.

Further, if the application does not use the personal FIB, as determined at block 1124, then the application is using another FIB besides the enterprise_unsecure FIB and personal FIB, and therefore no change is made to the application. Therefore the process proceeds from block 1124 to block 1122 and ends.

Therefore, in accordance with FIGS. 10 and 11, applications that are designated as work applications are migrated to the enterprise_unsecure FIB and can then seamlessly permit the split billing between the personal and work APNs.

While the above is described with regards to a work and personal space, the split billing could equally be used for a device having two or more users, where each user has application associated with them. In this way, each user could obtain a bill for the voice and data each uses on the device.

Further, while the above is described with regards to two spaces, in some embodiments more than two APNs and phone numbers could be associated with a device, and more than two bills generated. The startup and shut down procedures for a many identities is similar to that described above with regards to FIGS. 4 to 11.

The above may be implemented on any computing device. If the above is implemented on a user equipment, one example is provided with regard to FIG. 12.

UE 1200 may be a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1200 is enabled for two-way communication, it may incorporate a communication subsystem 1211, including both a receiver 1212 and a transmitter 1214, as well as associated components such as one or more antenna elements 1216 and 1218, local oscillators (LOs) 1213, and a processing module such as a digital signal processor (DSP) 1220. Although not shown, communication subsystem 1211 may include additional components. For example, UE 1200 may comprise multiple receivers 1212 and/or transmitters 1214 to allow for simultaneous radio activity. In addition, as will be apparent to those skilled in the field of communications, the particular design of the communication subsystem 1211 will be dependent upon the communication network in which the device is intended to operate.

Network access requirements will also vary depending upon the type of network 1219. In some networks network access is associated with a subscriber or user of UE 1200. A UE may require one or more smart cards which can contain different applications such as a USIM, RUIM or a SIM application in order to operate on a network. The smart card interface 1244 is normally similar to a card-slot into which a smart card can be inserted and ejected. The smart card can have memory and hold many key configurations 1251, and other information 1253 such as identification, and subscriber related information.

Figure 12:
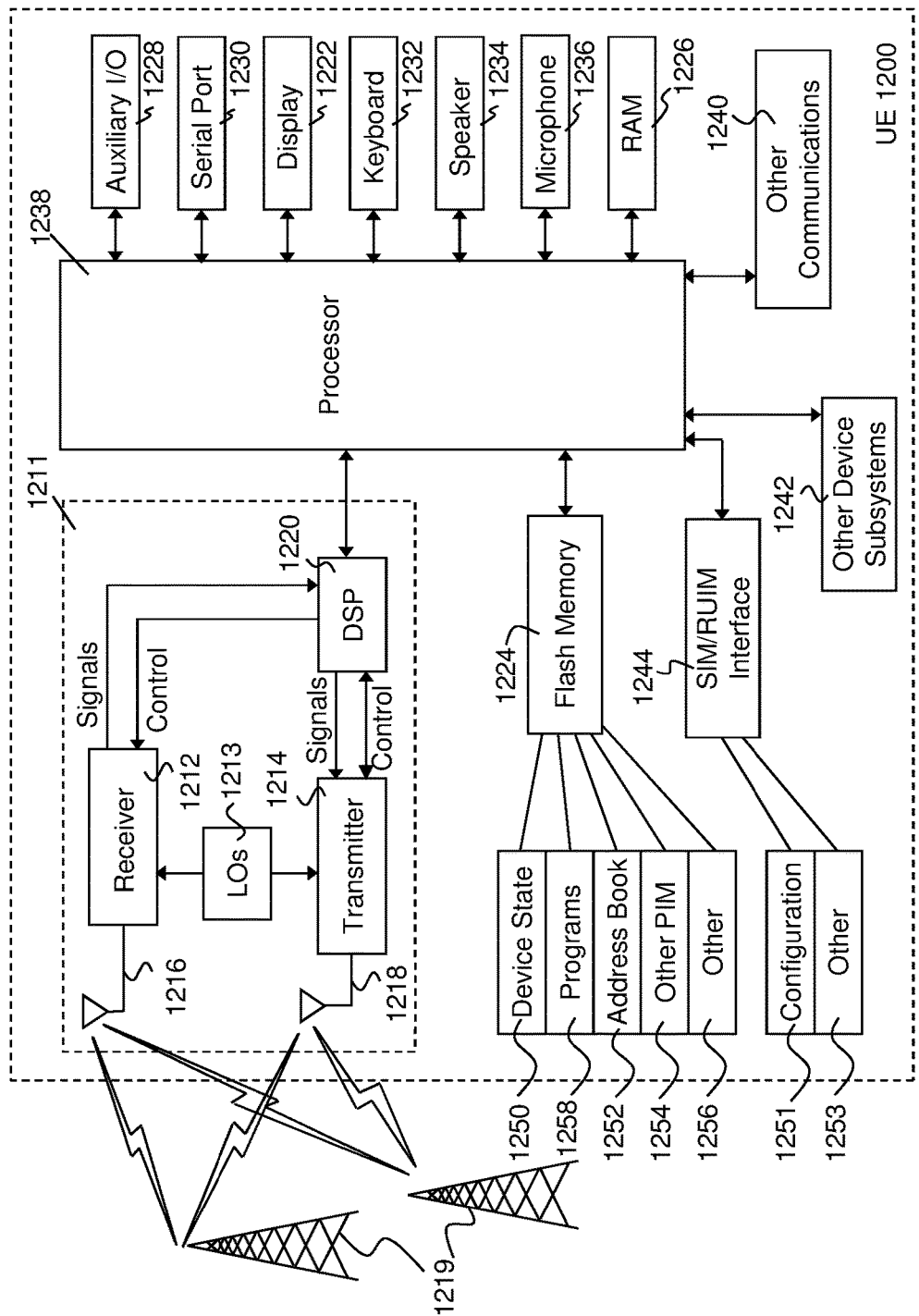
FIG. 12 is a block diagram of an example mobile device capable of being used with the embodiments of the present disclosure.

When required network registration or activation procedures have been completed, UE 1200 may send and receive communication signals over the network 1219. As illustrated in FIG. 12, network 1219 can consist of multiple base stations communicating with the UE.

Signals received by antenna 1216 through communication network 1219 are input to receiver 1212, which may perform such common receiver functions as signal amplification, frequency down conversion, filtering, channel selection and the like. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

UE 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Processor 1238, in addition to its operating system functions, may enable execution of software applications on the mobile device. A predetermined set of applications that control basic operations, including at least data and voice communication applications for example, will normally be installed on UE 1200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1219. Further applications may also be loaded onto the UE 1200 through the network 1219, an auxiliary I/O subsystem 1228, serial port 1230, short-range communications subsystem 1240 or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both. For example, secure communication applications may enable electronic commerce functions and other such financial transactions to be performed using the UE 1200.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of UE 1200 may also compose data items such as email messages for example, using the keyboard 1232, which may be a complete alphanumeric keyboard or telephone-type keypad, whether virtual or real, among others, in conjunction with the display 1222 and possibly an auxiliary I/O device 1228. Such composed items may then be transmitted over a communication network through the communication subsystem 1211.

For voice communications, overall operation of UE 1200 is similar, except that received signals would typically be output to a speaker 1234 and signals for transmission would be generated by a microphone 1236. Alternative voice or audio I/O subsystems, such as a voice message recording subsystem, may also be implemented on UE 1200. Although voice or audio signal output is generally accomplished primarily through the speaker 1234, display 1222 may also be used to provide an indication of the identity of a calling party, the duration of a voice call, or other voice call related information for example.

Serial port 1230 in FIG. 12 would normally be implemented in a personal digital assistant (PDA)-type UE for which synchronization with a user's desktop computer (not shown) may be desirable, but is an optional device component. Such a port 1230 would enable a user to set preferences through an external device or software application and would extend the capabilities of UE 1200 by providing for information or software downloads to UE 1200 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the UE to a computer to act as a modem.

Other communications subsystems 1240, such as a short-range communications subsystem, is a further optional component which may provide for communication between UE 1200 and different systems or devices, which need not necessarily be similar devices. For example, the subsystem 1240 may include an infrared device and associated circuits and components or a Bluetooth™ communication module to provide for communication with similarly enabled systems and devices. Subsystem 1240 may further include non-cellular communications such as Wi-Fi or WiMAX.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment to facilitate splitting of data billing between at least two parties, the method comprising:
   creating, within a first forwarding information base ("FIB"), an association of the first FIB to a first cellular data interface;
   activating the splitting of data billing on the user equipment;
   replacing, within the first FIB, the association of the first FIB to the first cellular data interface with an association between a second cellular data interface and the first FIB; and
   assigning an application a group identifier of the first FIB to migrate the application to the second cellular data interface.

2. The method of claim 1, wherein the first cellular data interface is a personal cellular data interface and the second cellular data interface is a work cellular data interface.

3. The method of claim 1, wherein the first FIB is an unsecure enterprise FIB.

4. The method of claim 1, wherein the assigning is performed by an enterprise server.

5. The method of claim 1, further comprising starting the application within the first FIB to migrate the application to the second cellular data interface.

6. The method of claim 1, wherein the activating comprises:
   starting, at the user equipment, a virtual subscriber identity module platform ('VSP') service;

verifying VSP configuration information with a network server; and upon verification, starting a data networking access point name ('APN') based on the configuration information on the user equipment.

7. The method of claim 1, wherein the first FIB includes all of the interfaces of a second FIB prior to the activating the splitting of data billing.

8. The method of claim 7, wherein the first FIB is an unsecure enterprise FIB and the second FIB is a personal FIB, and wherein the first FIB and second FIB are identical until the activating the splitting of data billing.

9. The method of claim 1, further comprising associating the first FIB with the first cellular data interface upon deactivating the splitting of data billing.

10. A user equipment configured to facilitate splitting of data billing between at least two parties, the user equipment comprising:

a processor; and a communications subsystem, wherein the user equipment is configured to:

create, within a first forwarding information base ("FIB"), an association of the first FIB to the first FIB with a first cellular data interface;

activate the splitting of data billing on the user equipment;

replace, within the first FIB, the association of the association in the first FIB to the first cellular data interface with an association between a second cellular data interface and the first FIB; and assign an application a group identifier of the first FIB to migrate the application to the second cellular data interface.

11. The user equipment of claim 10, wherein the first cellular data interface is a personal cellular data interface and the second cellular data interface is a work cellular data interface.

12. The user equipment of claim 10, wherein the first FIB is an unsecure enterprise FIB.

13. The user equipment of claim 10, wherein the user equipment is configured to assign based on an enterprise server.

14. The user equipment of claim 10, further configured to start the application within the first FIB to migrate the application to the second cellular data interface.

15. The user equipment of claim 10, wherein the user equipment is configured to activate by:

starting, at the user equipment, a virtual subscriber identity module platform ('VSP') service;

verifying VSP configuration information with a network server; and upon verification, starting a data networking access point name ('APN') based on the configuration information on the user equipment.

16. The user equipment of claim 10, wherein the first FIB includes all of the interfaces of a second FIB prior to the activating the splitting of data billing.

17. The user equipment of claim 16, wherein the first FIB is an unsecure enterprise FIB and the second FIB is a personal FIB, and wherein the first FIB and second FIB are identical until the activating the splitting of data billing.

18. The user equipment of claim 10, further configured to associate the first FIB with the first cellular data interface upon deactivating the splitting of data billing.

19. A non-transitory computer readable medium comprising instructions that, when executed by a processor of a user equipment, are configured to facilitate splitting of data billing between at least two parties, the instructions providing:

creating, within the first FIB, an association of the first FIB to a first cellular data interface;

activating the splitting of data billing on the user equipment;

replacing, within the first FIB, the association of the association in the first FIB to the first cellular data interface with an association between a second cellular data interface and the first FIB; and assigning an application a group identifier of the first FIB to migrate the application to the second cellular data interface.

20. The non-transitory computer readable medium of claim 19, wherein the first cellular data interface is a personal cellular data interface and the second cellular data interface is a work cellular data interface.

* * * * *